(12) United States Patent
Pügerl

(10) Patent No.: US 12,442,598 B2
(45) Date of Patent: Oct. 14, 2025

(54) HEAT EXCHANGER

(71) Applicant: Maximilian Pügerl, Kirchroth (DE)

(72) Inventor: Maximilian Pügerl, Kirchroth (DE)

(73) Assignee: Maximilian Pügerl, Kirchroth (DE)

( * ) Notice: Subject to any disclaimer, the term of this patent is extended or adjusted under 35 U.S.C. 154(b) by 173 days.

(21) Appl. No.: 18/025,933

(22) PCT Filed: Aug. 26, 2021

(86) PCT No.: PCT/EP2021/073576
§ 371 (c)(1),
(2) Date: Mar. 13, 2023

(87) PCT Pub. No.: WO2022/053324
PCT Pub. Date: Mar. 17, 2022

(65) Prior Publication Data
US 2023/0408202 A1    Dec. 21, 2023

(30) Foreign Application Priority Data
Sep. 11, 2020   (DE) ..................... 10 2020 123 751.0

(51) Int. Cl.
*F28D 7/00*       (2006.01)
*F28D 7/08*       (2006.01)
*F28D 7/16*       (2006.01)
*F28F 1/40*       (2006.01)

(52) U.S. Cl.
CPC ........... *F28D 7/085* (2013.01); *F28D 7/0058* (2013.01); *F28D 7/1615* (2013.01); *F28F 1/40* (2013.01)

(58) Field of Classification Search
CPC ......... F28D 7/0058; F24H 1/205; F24H 1/206
See application file for complete search history.

(56) References Cited

U.S. PATENT DOCUMENTS

| 1,528,859 | A | * | 3/1925 | Claudy | ................... F28F 13/06 |
| | | | | | 138/38 |
| 2,495,673 | A | * | 1/1950 | Erwin | ................... F28D 7/0058 |
| | | | | | 126/91 A |
| 4,550,772 | A | * | 11/1985 | Knoch | ................... F24B 7/005 |
| | | | | | 165/47 |
| 4,653,434 | A | * | 3/1987 | Wilhelm, Jr. | ........... F24H 1/205 |
| | | | | | 122/18.31 |
| 9,523,538 | B2 | | 12/2016 | Okonski et al. | |

(Continued)

FOREIGN PATENT DOCUMENTS

| CN | 105928394 A | 9/2016 |
| DE | 68905806 T2 | 11/1993 |

(Continued)

*Primary Examiner* — Eric S Ruppert
(74) *Attorney, Agent, or Firm* — Dickinson Wright PLLC; Andrew D. Dorisio; Nicholas P. Coleman

(57) ABSTRACT

The invention relates to a heat exchanger (1), in particular for heating up, heating and/or evaporating a fluid, said heat exchanger (1) comprising a heat exchanger tube (2) and a plurality of tubes (10) penetrating the heat exchanger tube (2) and being spaced apart from each other, wherein the heat exchanger tube (2) has double the number of openings (5, 6) based on the number of tubes (10), wherein each tube (10) is guided through two of these openings (5, 6), and wherein the tubes (10) are connected to the heat exchanger tube (2) on both sides via their end tube sockets (11, 12).

15 Claims, 10 Drawing Sheets

(56) References Cited

U.S. PATENT DOCUMENTS

| | | | |
|---|---|---|---|
| 10,184,690 B2 * | 1/2019 | Steinhafel | ............ F24H 15/223 |
| 2015/0233588 A1 | 8/2015 | Betts et al. | |
| 2019/0154300 A1 | 5/2019 | Kondo et al. | |

FOREIGN PATENT DOCUMENTS

| | | | |
|---|---|---|---|
| DE | 102012204439 A1 | | 9/2013 |
| EP | 2851118 A1 | | 3/2015 |
| JP | 53141174 A | | 12/1978 |
| JP | H0377636 A | | 4/1991 |
| KR | 20190083462 A | | 7/2019 |
| SU | 1112194 A | * | 9/1984 |
| WO | 2005021122 A2 | | 3/2005 |

* cited by examiner

Section A-A

HEAT EXCHANGER

TECHNICAL FIELD

The present invention relates to a heat exchanger having a heat exchanger tube. Moreover, the invention relates to an evaporation device comprising a heat exchanger. Furthermore, the invention relates to a heat exchanger device comprising a heat exchanger. In addition, the invention relates to an installation comprising at least one evaporation device and/or at least one heat exchanger device. Besides, the invention relates to a container comprising a heat exchanger and to a water basin having a container.

BACKGROUND

Heat exchangers are known from the state of the art for a long time. By means of the known heat exchangers, thermal energy can be transferred from one substance flow to another.

With the known heat exchangers, it is disadvantageous that they have a degree of efficiency which is improvable.

SUMMARY

The object of the invention at hand is to overcome the disadvantages of the state of the art which are described above.

According to the invention, this object is attained by a heat exchanger of the type mentioned at the beginning, wherein the heat exchanger comprises a heat exchanger tube and a plurality of tubes penetrating the heat exchanger tube and being spaced apart from each other, wherein the heat exchanger tube has double the number of openings based on the number of tubes, wherein each tube is guided through two of these openings and/or extends through two of these openings and/or connects the two openings to each other, and wherein the tubes are connected to the heat exchanger tube on both sides via their end tube sockets.

In this case, the heat exchanger tube can be used for heating up, heating and/or evaporating a fluid surrounding the heat exchanger tube, such as water, air or the like. Preferably, the fluid is a liquid.

The end tub sockets are connected to the heat exchanger tube in the area of the openings of the heat exchanger tube. The end tube sockets can be attached to the heat exchanger tube or connected to it. The inner shell surface of the tubes can form a common shell surface or surface with the outer remaining shell surface. Preferably, the openings serve thus to accommodate the tubes, in particular their ends.

A fluid guided in the heat exchanger can be a liquid, water or the like. Preferably, the fluid in the heat exchanger tube is air.

With the heat exchanger according to the invention, it is made possible to enlarge the surface of the heat exchanger tube outwardly due to the usage of the tubes penetrating the heat exchanger tube. Thereby, it can be achieved that heated or hot fluid (e.g. air) in the heat exchanger tube gets to the tubes and that the air experiences a swirl effect in this process.

The heat exchange is the greatest via the many tubes since, there, the heat exchange is the most effective and an additional circulation occurs in a fluid surrounding the heat exchanger. The air in the heat exchanger tube comes into contact with the shell surface of the heat exchanger tube, which is enlarged due to the plurality of tubes, and transfers the heat into the fluid (e.g. liquid) surrounding the heat exchanger tube of the heat exchanger.

Thus, the degree of efficiency of the heat exchanger can be improved.

The shell surface of the heat exchanger increases considerably when using little fluid to be heated.

A heat exchange is the greatest when using the plurality of tubes since, there, the heat exchange is the most effective and an additional circulation of the fluid surrounding the heat exchanger occurs, which has been confirmed by tests.

A plurality of tubes can also be understood to be a plurality of tubes. A heat exchanger tube can also be understood to be a tube duct.

The tubes penetrating the heat exchanger tube are tubes which are disposed within the heat exchanger and/or which are guided through the heat exchanger. The tubes can be hollow, in particular hollow-cylindrical. In particular, the tubes are realized as round tubes or square tubes. Further designs are conceivable.

Fluid, in particular in the form of air, can be heated e.g. by means of a burner disposed on the heat exchanger at the inlet side, wherein the heat exchanger is configured to heat the fluid which surrounds it, e.g. in a container. Additionally, a fan can be disposed on the heat exchanger at the outlet side so that the burner does not have to push the air through the heat exchanger, but the air is drawn.

A connection of the end tube sockets to the heat exchanger tube is realized or formed in a fluid-tight manner. Due to a fluid-tight realization, a mixing of e.g. air in the heat exchanger tube with the fluid to be heated up, to be heated or to be evaporated can be prevented.

The heat exchanger can be an evaporator and the heat exchanger tube can be an evaporation tube.

Preferably, the openings are disposed diametrically and/or central longitudinal axes of the tubes run orthogonally to the central longitudinal axis of the heat exchanger tube. Due to this arrangement, the swirl effect of the hot air in the heat exchanger can be further intensified.

A diametrical arrangement can be understood to be an arrangement in which the central longitudinal axes of the tubes perpendicularly intersect the central longitudinal axis of the heat exchanger tube. In other words, the central longitudinal axis of the respective tubes runs through the center of the heat exchanger tube. Thereby, a symmetrical orientation of the tubes relative to the heat exchanger tube can be achieved.

Further preferably, the tubes are disposed helically in the heat exchanger tube. Due to this arrangement, the swirl effect of the hot air in the heat exchanger can be further intensified.

A helical arrangement can also be understood to be an arrangement which is helicoidal, helicoid or spiral-shaped or like.

The tubes can be offset relative to each other and run helically in the heat exchanger tube.

If the individual tubes are disposed helically relative to each other in the heat exchanger tube, preferably, the openings in the heat exchanger tube are disposed opposite to each other.

Alternatively, the tubes can also be guided obliquely through the heat exchanger tube. In other words, the central longitudinal axes of the tubes form an angle relative to the central longitudinal axis of the heat exchanger tube.

Preferably, in or along an axial direction of the heat exchanger tube, the tubes are offset relative to each other at an angle $\alpha$ in the range of 15° to 25°, in particular at 20°. In this arrangement, intensified swirl effects of the air in the heat exchanger have occurred at the tubes.

In another preferred embodiment of the heat exchanger according to the invention, a diameter of the tubes is in the range of ⅙ to ½, in particular ¼, of the diameter of the heat exchanger tube. In this arrangement, intensified swirl effects of the air in the heat exchanger have occurred at the tubes. Especially preferably, the end tube sockets project at their ends on the heat exchanger tube. This allows the tubes to be easily mounted on or fixed to the heat exchanger tube.

Further preferably, a connection between the end tube sockets and the heat exchanger tube is a welded connection, a rolled connection, a soldered connection, an adhesive connection or a pressed connection. Thus, simple methods are provided in order to achieve a strong and fluid-tight connection.

Especially preferably, the heat exchanger tube comprises three tube sections, wherein a second tube section connects a first tube section and a third tube section to each other and wherein the first tube section and the third tube section are disposed parallel to each other.

The first tube section can be understood to be a tube section on the combustion tube side or a combustion tube. The second tube section can be understood to be a connection tube. The third tube section can be understood to be a tube section on the fan side or a fan tube.

Alternatively, the heat exchanger tube can also be integrally formed. In this case, a first end section of the heat exchanger tube can be disposed parallel to a second end section of the heat exchanger tube. In this case, the heat exchanger tube has a corresponding curvature or bend.

Preferably, the heat exchanger comprises an attachment plate for the connection to a heat exchanger device and/or an evaporation device. Due to the provision of the attachment plate, it is possible to insert the heat exchanger into the evaporation device and into a heat exchanger device. In the case at hand, it is required that both the evaporation device and the heat exchanger device have a corresponding design for accommodating the attachment plate.

Especially preferably, the attachment plate has two openings for accommodating the first tube section and the third tube section.

In this case, the heat exchanger tube can be realized in such a manner that the first tube section of the heat exchanger tube is guided through a first opening of the attachment plate and the third tube section of the heat exchanger tube is guided through a second opening of the attachment plate. This allows the first tube section of the heat exchanger tube and the third tube section of the heat exchanger tube to be guided through one and the same component.

Preferably, the heat exchanger tube has a 180° bend or is bent multiple times.

Further preferably, the second tube section comprises an additional tube which penetrates at least the tube section on the combustion tube side and the tube section on the fan side on the shell side and runs and/or is disposed within the second tube section.

If the heat exchanger according to the invention is to be used to heat up a liquid medium, in particular to heat up water, it is advantageous if the heat exchanger tube is accommodated in a tube having a larger diameter in which the liquid medium which is to be heated up flows and, in this process, flows around the heat exchanger tube.

Especially preferably, the heat exchanger comprises a flange, which has two openings, for the connection to a gas burner and a fan, wherein the flange is disposed at the end of the tube sections of the heat exchanger tube. For this purpose, a gas burner attachment and a fan attachment can be disposed on the flange.

Preferably, the heat exchanger comprises a gas burner and a fan, the gas burner being attached to the gas burner opening and the fan being attached to the fan opening.

Most preferably, a heat exchanger unit having a heat exchanger as described above is provided. The heat exchanger unit can comprise a gas burner and a fan, the gas burner being attached to the gas burner opening of the heat exchanger and the fan being attached to the fan opening of the heat exchanger.

The present invention furthermore relates to an evaporation device comprising a housing, a condenser and at least one heat exchanger as described above.

Preferably, the housing comprises at least one opening for inserting the heat exchanger into the evaporation device and/or for accommodating the attachment plate of the heat exchanger. This allows the heat exchanger to be inserted through the opening of the housing in an easy manner and to be fixed to and/or positioned on the housing via the attachment plate. Preferably, the evaporation device comprises a gas burner and/or a fan.

The present invention furthermore relates to a heat exchanger device having a housing and at least one heat exchanger as described above.

Preferably, the housing comprises at least one opening for inserting the heat exchanger into the heat exchanger device and/or for accommodating the attachment plate of the heat exchanger. This allows the heat exchanger to be inserted through the opening of the housing in an easy manner and to be fixed to and/or positioned on the housing via the attachment plate. Preferably, the heat exchanger device comprises a gas burner and/or a fan.

Moreover, the present invention relates to an installation comprising at least one evaporation device and/or at least one heat exchanger device.

In principle, fluids, in particular liquids, can be heated up and/or heated and/or evaporated by means of the installation.

Preferably, the installation has a frame or a stand for accommodating the devices. In this case, the evaporation device and the heat exchanger device can be inclined with respect to an imaginary plane extending horizontally. An inclination angle can be in the range of greater than 0° to 2.5°, in particular 1.5°.

The subsequent description of preferred exemplary embodiments of the invention in connection with the drawings and the dependent claims provides further features of the invention. The individual features can be realized individually or in combination with each other.

The present invention furthermore relates to a container, in particular a water container, comprising a heat exchanger, in particular as described above. Preferably, the container comprises a housing and a cover. Preferably, the housing is cylindrical and comprises a bottom.

Preferably, the heat exchanger tube of the heat exchanger has several tube sections. Preferably, at least two tube sections run of the tube sections run parallel or coaxially to each other in the container or within the container with respect to a central longitudinal axis. This allows a fluid surrounding the heat exchanger tube, e.g. water, to be heated up, heated and/or evaporated by the heat exchanger tube.

The tube sections which run parallel or coaxially to each other in the container can be connected to 180° bends.

Alternatively, the heat exchanger tube of the heat exchanger runs in a meandering manner in the container or within the container.

Preferably, the container comprises the above-mentioned cover. The cover can be connected to the housing of the container by means of screw connections or the like. Furthermore, a seal can be disposed between the cover and the housing. Preferably, the cover has an attachment for the gas burner, an attachment for the fan, a water inlet and a water outlet.

Especially preferably, the container is configured to heat up, heat and/or evaporate water introduced or conveyed into the container via the water inlet by means of the heat exchanger tube. By providing the water inlet, the water can be conveyed into the container in an easy manner.

Furthermore it is especially preferred that the container is configured to discharge, to direct or to convey the heated, heated up and/or evaporated water out of the container via the water outlet. Thus, the heated, heated up and/or evaporated water can be conveyed out of the container in an easy manner via the water outlet.

Preferably, the water at the water inlet has an initial temperature, the water at the water outlet having a final temperature which is increased compared to the initial temperature.

Preferably, a water conduit can be attached to the water inlet. This allows water to be supplied to the container. Especially preferably, another water conduit can be attached to the water outlet. This allows water to be drained from the container. Further preferably, the water inlet and/or the water outlet protrude(s) partially into the container.

Especially preferably, the container has a pump. With said pump, the water to be heated up, to be heated and/or to be evaporated can be conveyed through the container in an easy manner.

Moreover, the present invention relates to a water basin, in particular a swimming pool or a swimming pond, comprising a container, in particular as described above. This allows water of a water basin, in particular a swimming pool or a swimming pond, to be heated up or warmed up when flowing through the container.

BRIEF DESCRIPTION OF THE DRAWINGS

The subsequent description of preferred exemplary embodiments of the invention in connection with the drawings and the dependent claims provides further features of the invention. The individual features can be realized individually or in combination with each other.

In the drawings.

DETAILED DESCRIPTION

Figure 1:
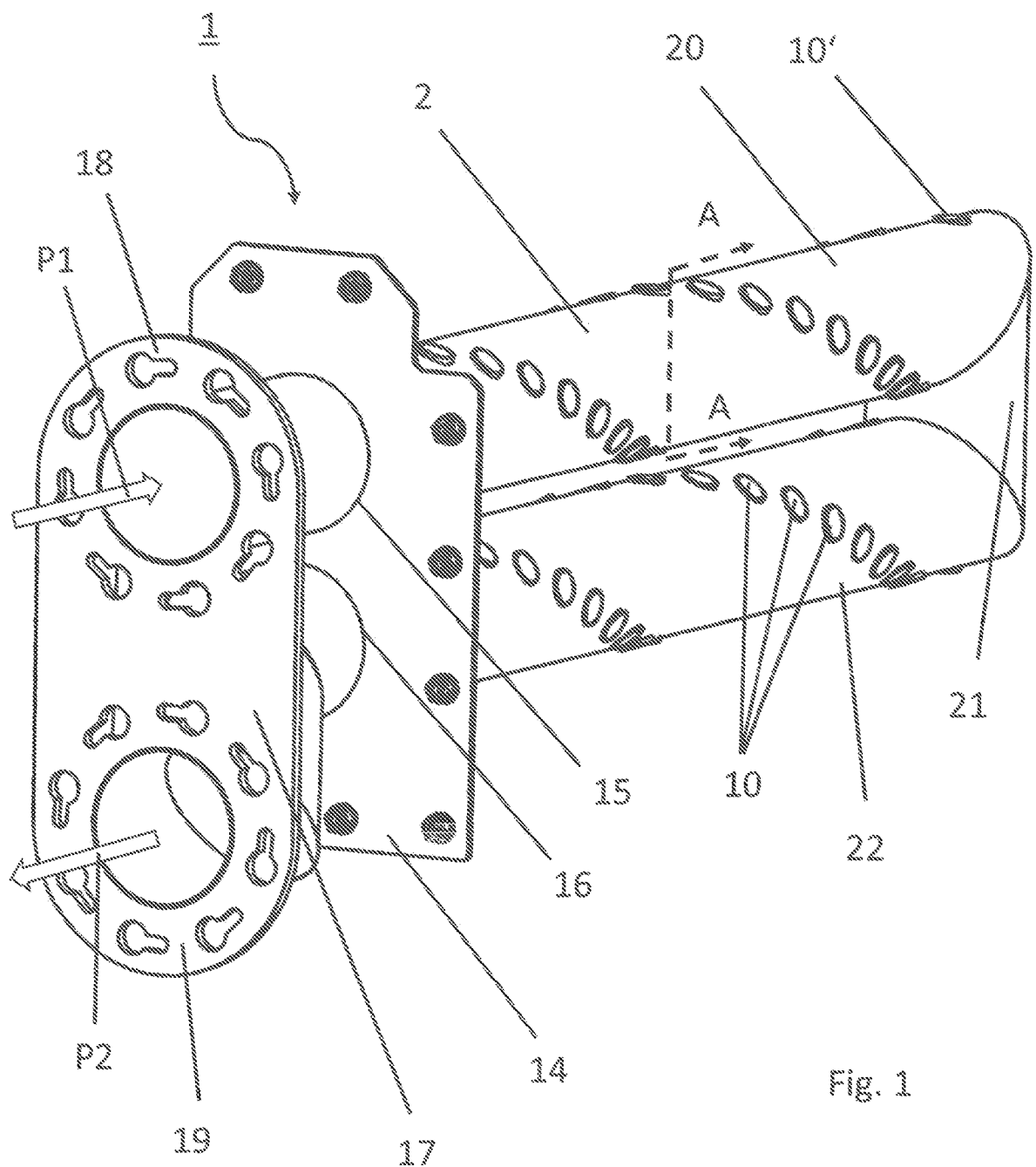
FIG. 1: shows a perspective illustration of a heat exchanger according to the invention.

FIG. 1 shows a heat exchanger 1 according to the invention having a heat exchanger tube 2. Heat exchanger tube 2 serves to heat up, heat and/or evaporate a fluid, e.g. a liquid, surrounding heat exchanger tube 2.

Heat exchanger tube 2 comprises three tube sections 20, 21 and 22. A second tube section 21 connects a first tube section 20 and a third tube section 22 to each other. In this case, first tube section 20 and third tube section 22 are disposed parallel to each other.

Furthermore, a plurality of tubes 10 is shown. Tubes 10 penetrate heat exchanger tube 2, in particular first tube section 20 and third tube section 22, tubes 10 being spaced apart from each other. Tubes 10 are disposed helically in heat exchanger tube 2. Heat exchanger tube 2 has double the number of openings, which are diametrically disposed, based on the number of tubes 10, wherein each tube 10 is guided through two of these openings or extends through two of these openings. Tubes 10 are connected to heat exchanger tube 2 on both sides via their end tube sockets 11 and 12 in the area of the openings. The connection is fluid-tight. Individual tubes 10 are realized as hollow-cylindrical tubes.

By providing tubes 10 penetrating heat exchanger tube 2, the shell surface of the heat exchanger is considerably enlarged.

Furthermore, heat exchanger 1 has an attachment plate 14. Attachment plate 14 has two openings 15 and 16 for accommodating first tube section 20 and third tube section 22 of heat exchanger tube 2. In this case, heat exchanger 2 is realized in such a manner that first tube section 20 of heat exchanger tube 2 is guided through first opening 15 of attachment plate 14 and third tube section 22 of heat exchanger tube 2 is guided through second opening 16 of attachment plate 14. Attachment plate 14 is configured to insert and mount heat exchanger 1 into/in a heat exchanger device and/or an evaporation device.

First tube section 20 disposed at the top in the sheet plane can be understood as tube section on the combustion tube side. Third tube section 22 disposed at the bottom in the sheet plane can be understood as tube section on the fan side. The vertical tube section connecting the tube section on the combustion tube side to the tube section on the fan side can be understood as second tube section 21.

Second tube section 21 comprises an additional tube 10' which penetrates at least tube section 20 on the combustion tube side and tube section 22 on the fan side on the shell side and runs within second tube section 21. Like tubes 10, tube 10' is connected to heat exchanger tube 2 on both sides via its end tube sockets.

Moreover, heat exchanger 1 has a flange 17 provided with two openings. Flange 17 is disposed at the end of the two tube sections 20 and 22. Flange 17 is configured to connect a gas burner and a fan at heat exchanger 1. For this purpose, a gas burner attachment 18 and a fan attachment 19 are disposed on flange 17.

A conveying direction of air heated by means of a gas burner (not shown) is illustrated by arrow P1. A conveying direction of cooled air suctioned by means of a fan (not shown) is illustrated by arrow P2.

With heat exchanger 1 according to the invention, it is made possible to enlarge the surface of heat exchanger tube 2 outwardly due to the usage of tubes 10 penetrating heat exchanger tube 2. Thereby, it can be achieved that heated or hot air in heat exchanger tube 2 gets to tubes 10 and that the air experiences a swirl effect in this process.

The heat exchange is the greatest in the many tubes 10 since, there, the heat exchange is the most effective and an additional circulation occurs in the liquid surrounding heat exchanger 1. The air in the heat exchanger comes into contact with the shell surface of heat exchanger tube 2, which is enlarged due to the plurality of tubes 10, and transfers the heat into the liquid surrounding heat exchanger tube 2 of heat exchanger 1.

Figure 2:
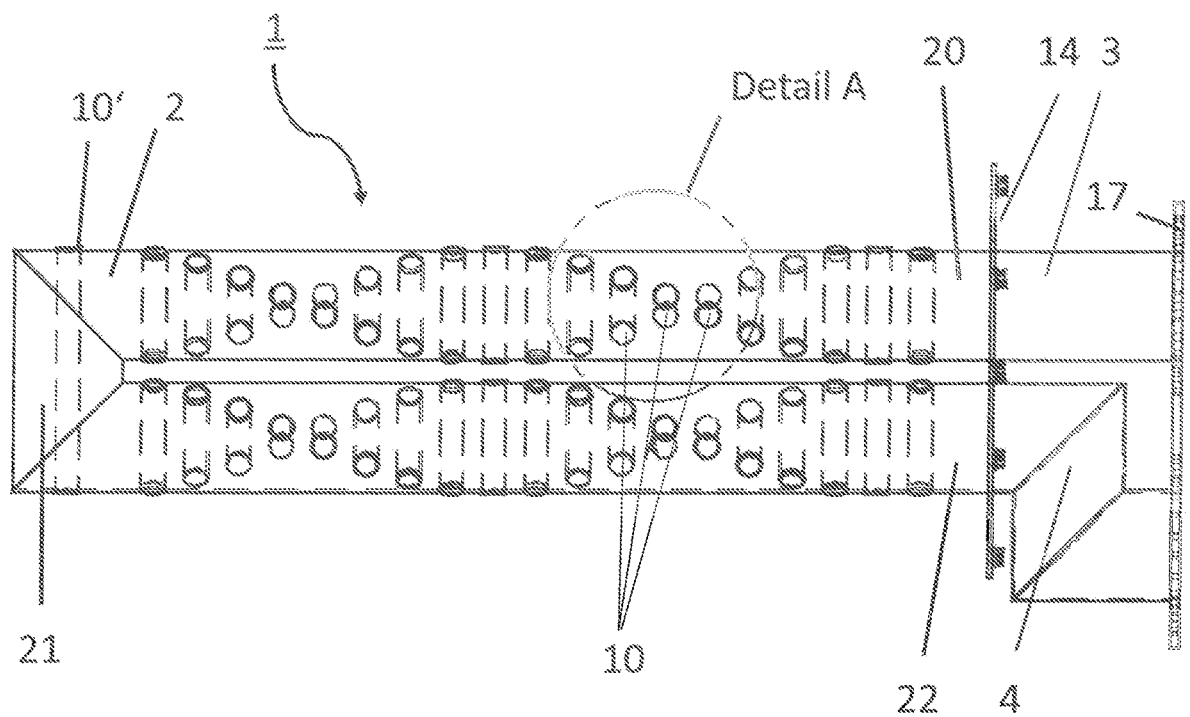
FIG. 2: shows a side view of the heat exchanger of FIG. 1 according to the invention.

FIG. 2 shows a side view of heat exchanger 1, wherein also the areas of individual tubes 10 and 20 which are actually not visible are shown. Optionally, first and third tube sections 20 and 22 can further comprise connection tube sections 3 and 4 to allow first and third tube sections 20 and 22 to be attached to flange 17.

Figure 3:
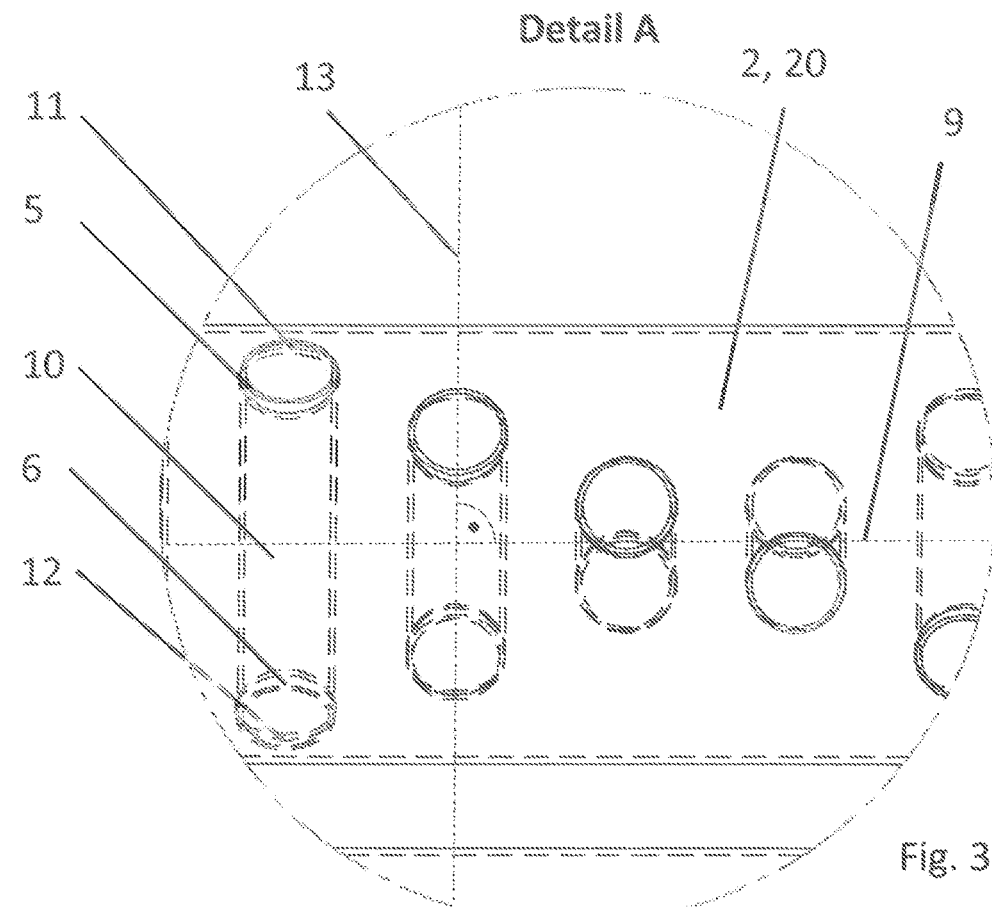
FIG. 3: shows a view of a detail A of FIG. 2.

FIG. 3 shows a detail A of FIG. 2. As indicated above, heat exchanger tube 2 has double the number of openings 5 and 6, which are diametrically disposed, based on the number of tubes 10, wherein each tube 10 is guided through two of these openings 5 and 6. In this case, central longitudinal axes 13 of tubes 10 run orthogonally to central longitudinal axis 9 of heat exchanger tube 2. A diameter of tubes 10 corresponds to approximately ⅕ of the diameter of heat exchanger tube 2. This results in intensified swirl effects of the air in heat exchanger tube 2 at tubes 10.

Furthermore, end tube sockets 11 and 12 of each tube 10 slightly project on both sides on heat exchanger tube 2. This allows a welded connection, a rolled connection or a pressed connection between end tube sockets 11 and 12 and heat exchanger tube 2 to be realized in an easy manner.

Figure 4:
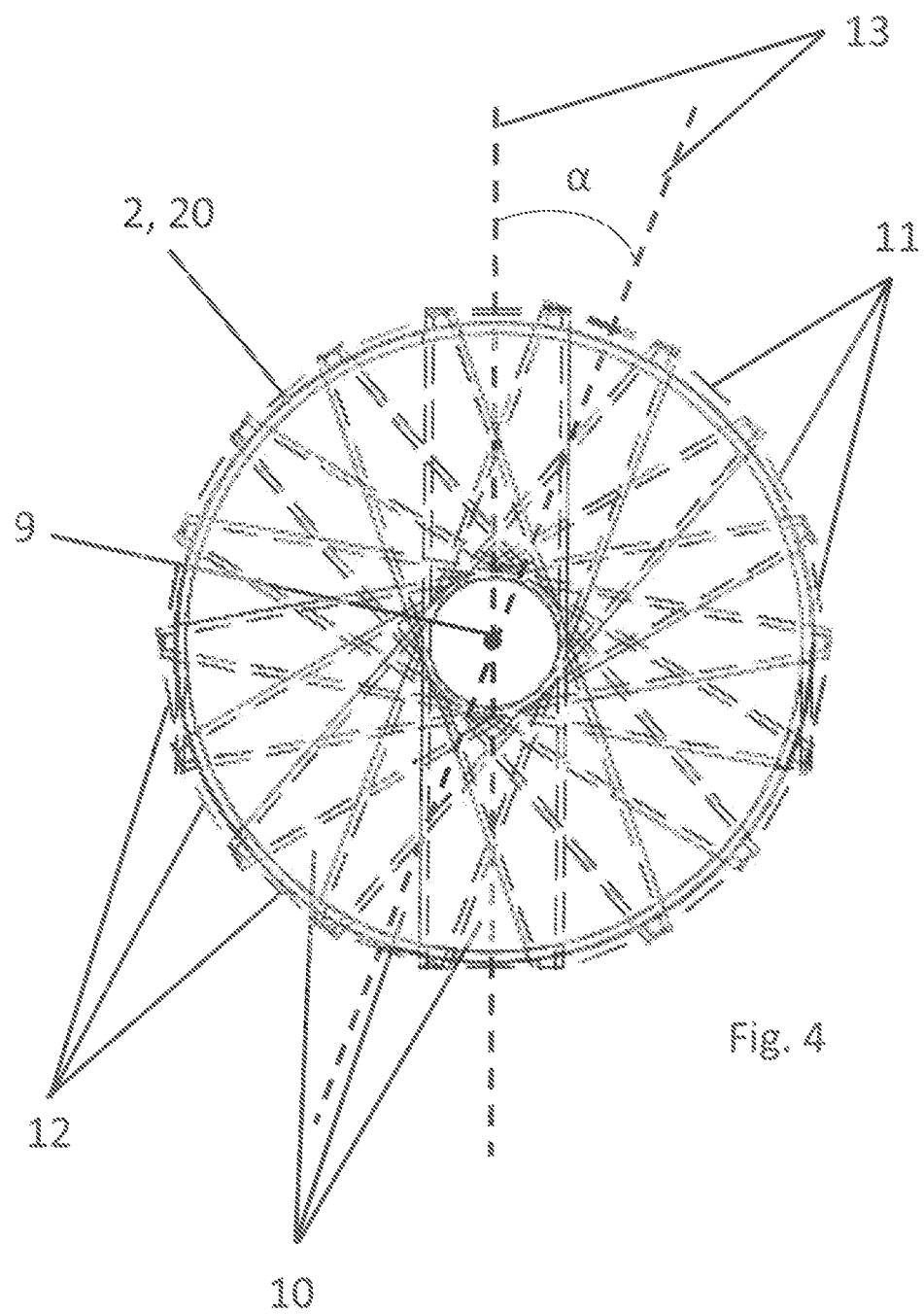
FIG. 4: shows a section A-A of FIG. 1.

FIG. 4 shows a section A-A of FIG. 1. In an axial direction of heat exchanger tube 2, tubes 10 are offset relative to each other at an angle α at approximately 20°. This allows intensified swirl effects of the air in heat exchanger tube 2 to be achieved at tubes 10.

Central longitudinal axes 13 of tubes 10 intersect central longitudinal axis 9 of heat exchanger tube 2 at right angles.

Figure 5:
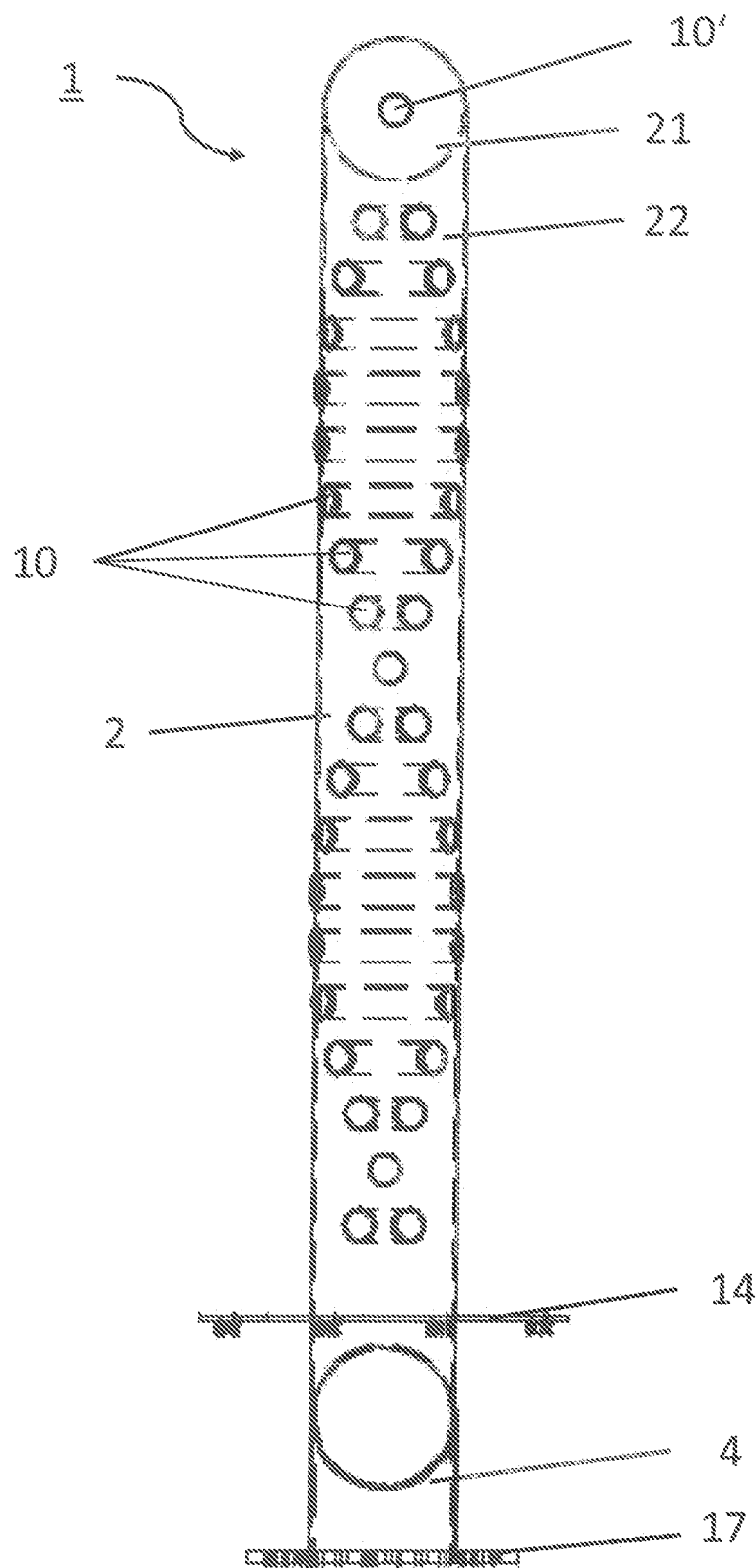
FIG. 5: shows a bottom view of the heat exchanger of FIG. 1 according to the invention.

FIG. 5 shows a bottom view of heat exchanger 1 according to the invention of FIG. 1, wherein also the areas of individual tubes 10 which are actually not visible are shown.

Figure 6:
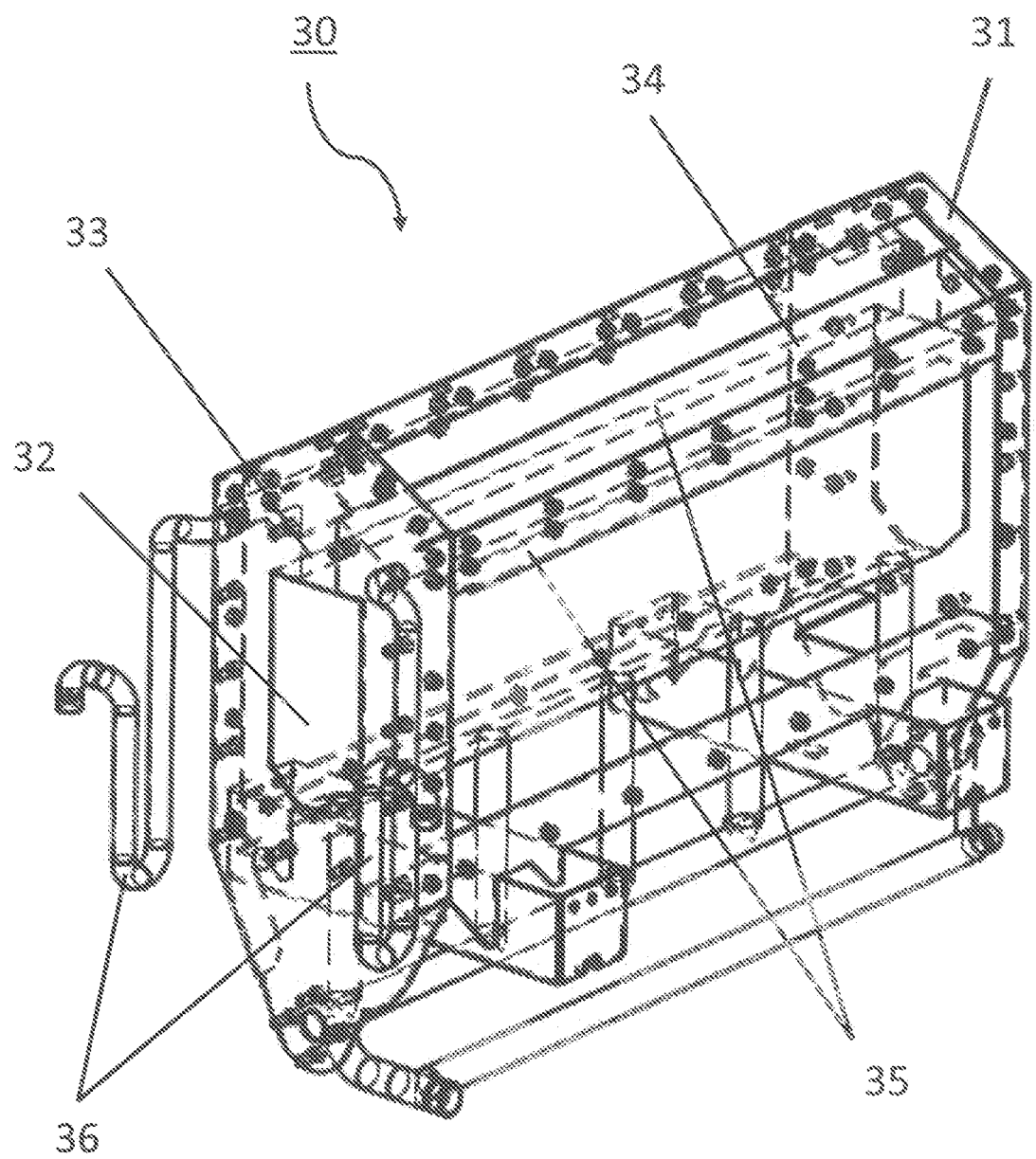
FIG. 6: shows a perspective illustration of an evaporation device according to the invention.

FIG. 6 shows a perspective illustration of an evaporation device 30 according to the invention. Evaporation device 30 has a housing 31 and a condenser 34. Housing 31 comprises at least one opening 32. Opening 32 serves to insert heat exchanger 1 into evaporation device 30 and to fix attachment plate 14 of heat exchanger 1 according to FIGS. 1 to 5 to housing 31. In housing 31 is a fluid to be evaporated, in particular a liquid.

Thus, heat exchanger 1 can be accommodated in housing 31 with its integrated attachment plate 14.

Evaporation device 30 is configured to convey vapor through at least one narrowed duct 33 into condenser 34. Said condenser 34 comprises a deflection plate which deflects the vapor to the side and condenses it as a result of a cooling process. The condensate produced in this process can be collected by respective channels 35 on either side of housing 31 and can be directed to a tube system 36. In this case, tube system 36 can be designed as a kind of siphon. Due to the design as siphon, a counter-pressure which intensifies the evaporation effect is generated in evaporation device 30.

Figure 7:
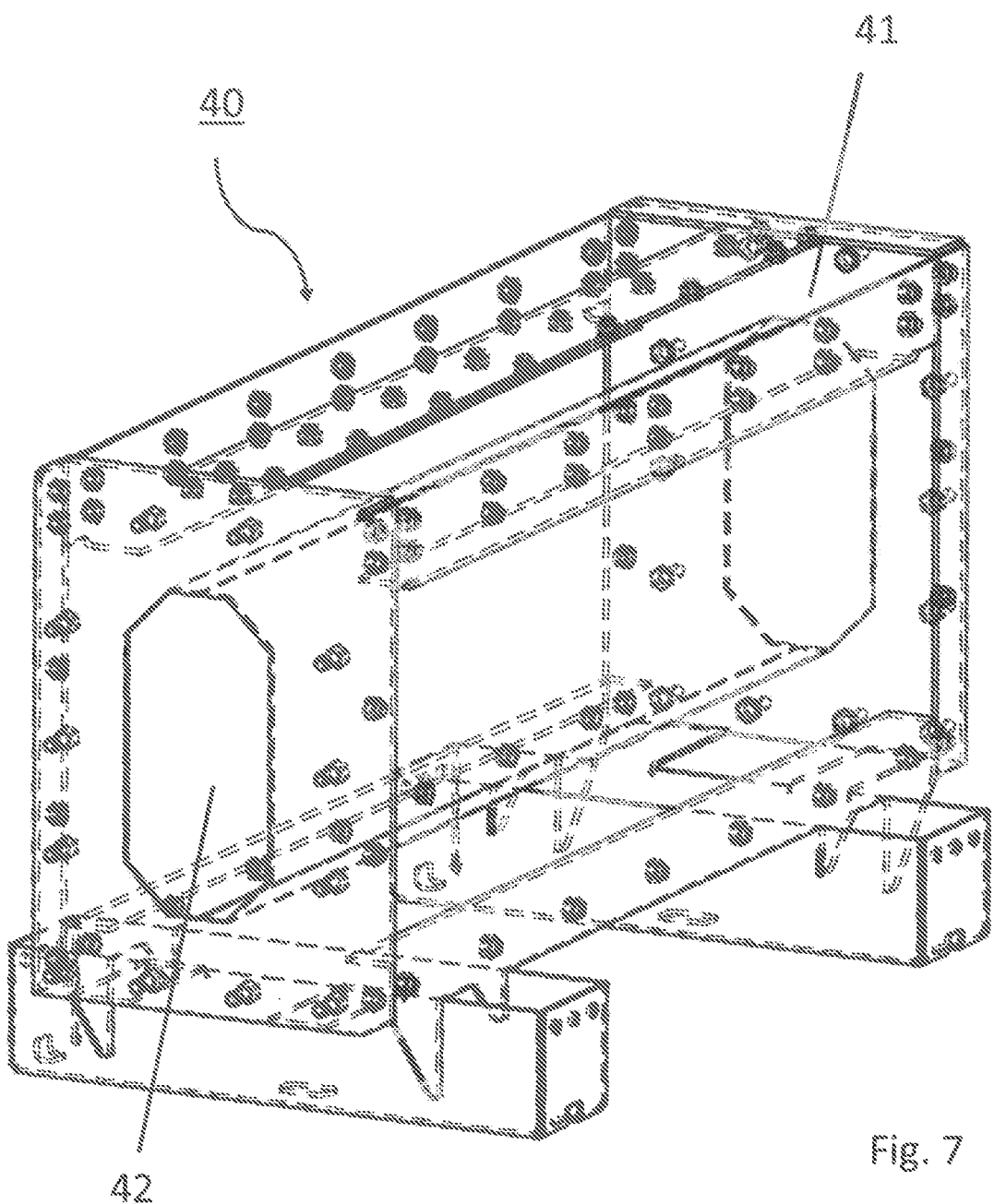
FIG. 7: shows a perspective illustration of a heat exchanger device according to the invention.

In FIG. 7, a perspective illustration of a heat exchanger device 40 according to the invention is shown. Heat exchanger device 40 has a housing 41. Housing 41 comprises at least one opening 42. Opening 42 serves to insert heat exchanger 1 into heat exchanger device 40 and to fix attachment plate 14 of heat exchanger 1 according to FIGS. 1 to 5 to housing 41. In housing 41 is a fluid to be heated up and/or to be evaporated, in particular a liquid.

Heat exchanger device 40 is designed as a closed container in which heat exchanger 1 is mountable. When heat exchanger 1 is mounted, the waste heat can be directed again, for example, from evaporation device 30 through heat exchanger device 40 in order to, thus, preheat the liquid which is then to be directed into evaporation device 30.

Figure 8:
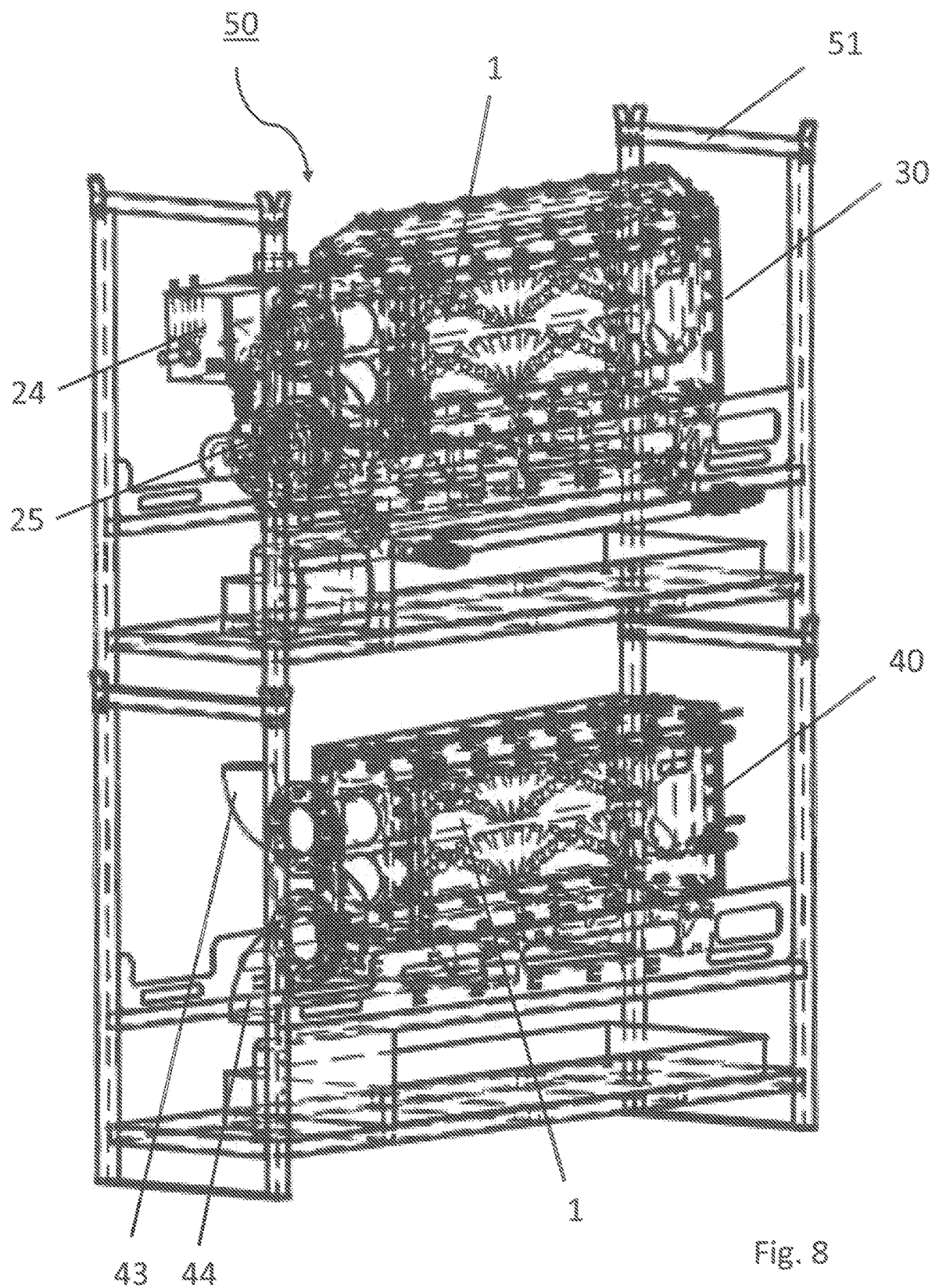
FIG. 8: shows a perspective illustration of an installation according to the invention.

In FIG. 8, a perspective illustration of an installation 50 according to the invention is shown. As shown, installation 50 comprises a frame or a stand 51 for accommodating an evaporation device 30 according to FIG. 6 and a heat exchanger device 40 according to FIG. 7. Evaporation device 30 comprises a gas burner 24 and a fan 25. Heat exchanger device 40 has two attachment sockets 43 and 44.

Installation 50 is designed in such a manner that evaporation device 30 and heat exchanger device 40 are disposed in frame/stand 51. Devices 30 and 40 can be stacked in any type of manner. The two devices 30 and 40 can be connected to conduits in order to pass on the liquid from heat exchanger device 40 to evaporation device 30.

Both evaporation device 30 and heat exchanger device 40 can be mounted in frame/stand 51 at a slope of approximately 1.5° so that condensed water produced in heat exchanger device 40 can run off.

Gas burner 24, fan 25 and attachment sockets 43 and 44 have been designed in such a manner that they each have the same attachment and, thus, can be mounted in installation 50 on flange 17 of heat exchanger 1 as needed.

In the case at hand, burner 24 and fan 25 were mounted on evaporation device 30. Furthermore, fan 25 was connected via attachment socket 43. As a result, the exhaust air heat is guided and/or pressed through heat exchanger device 40.

However, in the case at hand, it also would be possible to exchange fan 25 with attachment socket 43 and to connect the two attachment sockets 43 and 44. In this case, the exhaust air would also be drawn through heat exchanger device 40.

Advantageously, several heat exchanger devices 40 can be coupled to each other in order to achieve an improved heat output, for example.

Figure 9:
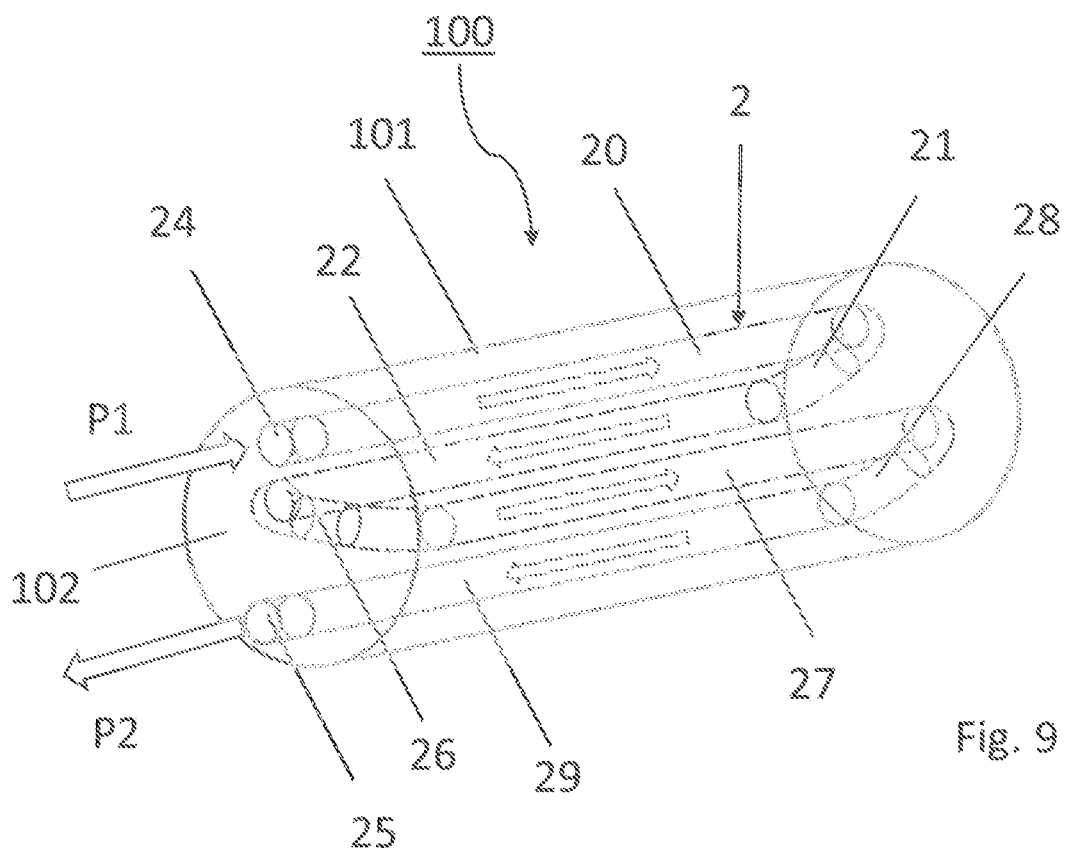
FIG. 9: shows a perspective illustration of a container according to the invention having a heat exchanger tube of a heat exchanger according to FIGS. 1 to 5.

FIG. 9 shows a container 100, in particular a water container. Container 100 comprises a housing 101 having a cover 102. Housing 101 is cylindrical and has a bottom. Furthermore, container 100 comprises a heat exchanger tube 2.

Heat exchanger tube 2 has several tube sections 20, 21, 22, 26, 27, 28 and 29. Tube sections 20, 21, 22, 26, 27, 28 and 29 of heat exchanger tube 2 are numbered consecutively in the conveying direction and/or flow direction (arrows P1 and P2).

Of tube sections 20, 21, 22, 26, 27, 28 and 29, four tube sections 20, 22, 27 and 29 are disposed parallel or coaxially to each other within the container with respect to a central longitudinal axis of container 100. Two tube sections 20 and 22 are connected to a tube section 21 which is realized as a 180° bend. Two tube sections 22 and 27 are connected to a tube section 26 which is realized as a 180° bend. Two tube sections 27 and 29 are connected to a tube section 28 which is realized as a 180° bend.

Figure 10:
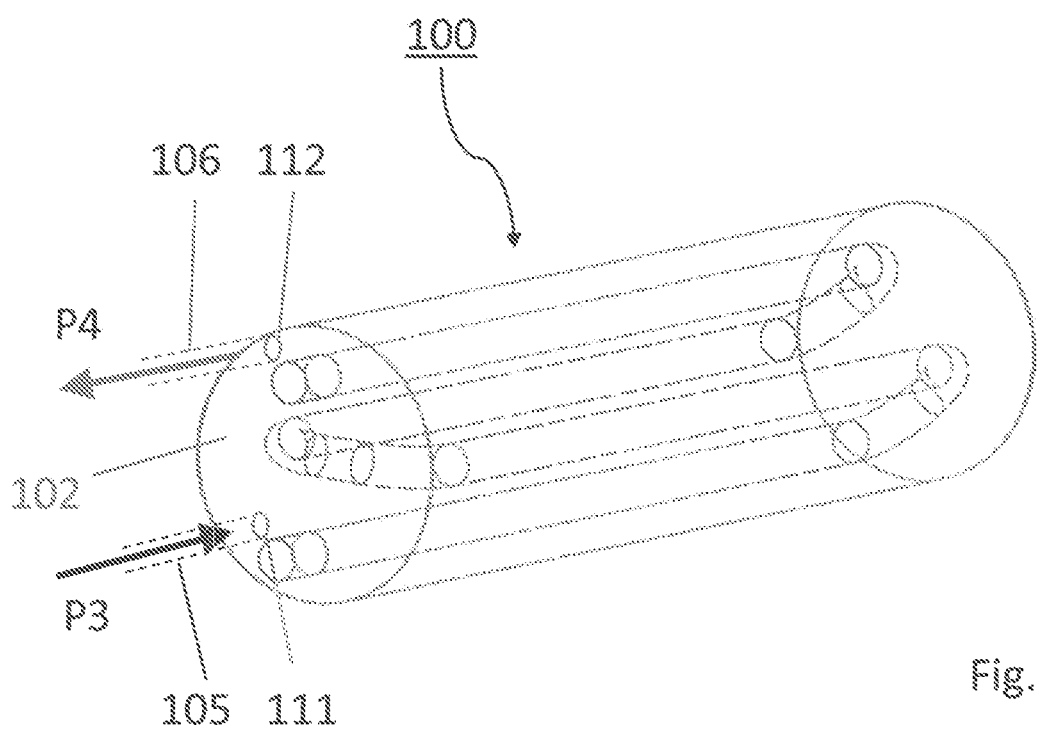
FIG. 10: shows the container of FIG. 9.

For the sake of clarity, FIG. 9 does not illustrate a water inlet and a water outlet. In FIG. 10, which is based on FIG. 9, water inlet 111 and water outlet 112 are shown.

Figure 11:
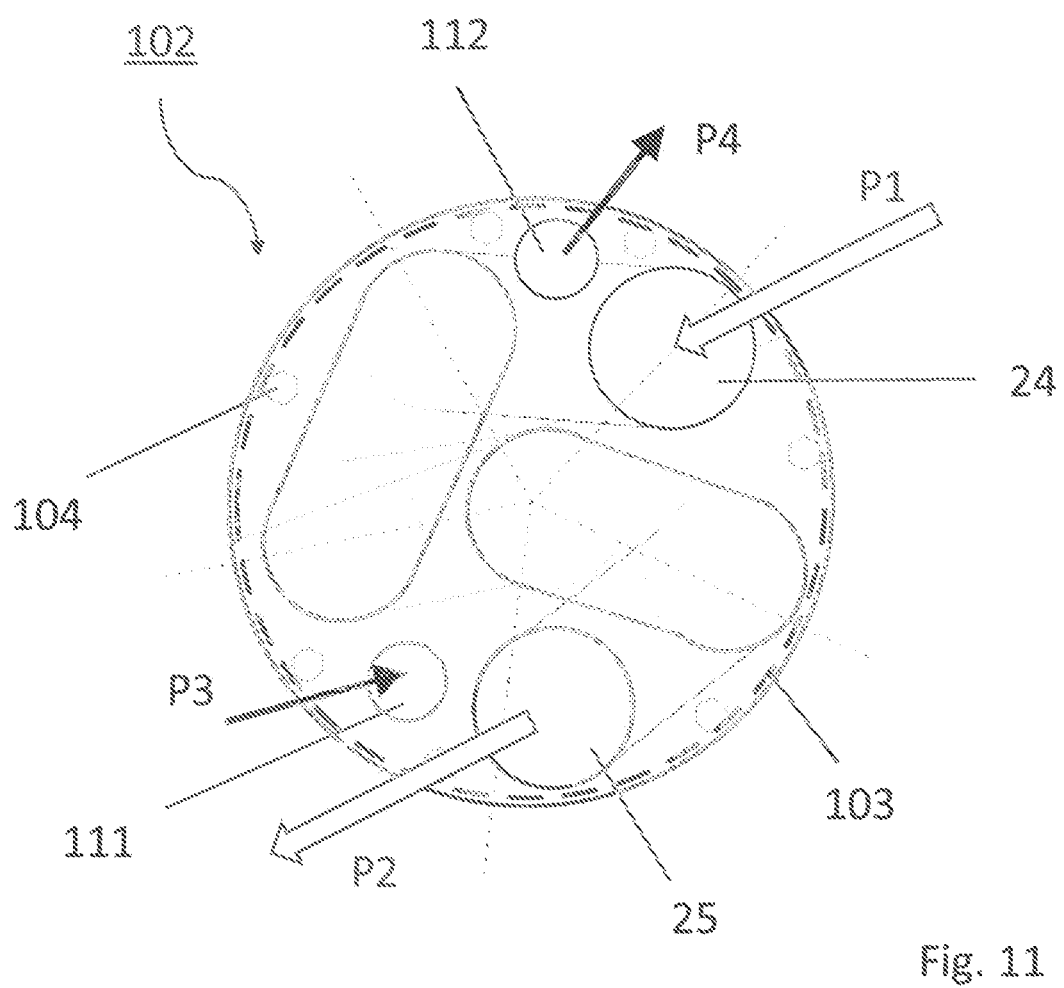
FIG. 11: shows a view of a cover of the container of FIGS. 9 and 10.

In addition to cylindrical housing 101, container 100 comprises a cover 102 as shown in FIG. 11. For connecting cover 102 to housing 101 of container 100, a seal 103 and a screw connection 104 or the like are provided. Cover 102 has one attachment for gas burner 24 and one attachment for fan 25. Furthermore, cover 102 has a water inlet 111 and a water outlet 112. A flexible tube 105 can be disposed at water inlet 111. A flexible tube 106 can be disposed at water outlet 112.

The shape of heat exchanger tube 2 shown in FIG. 11 is actually not visible, but it has been included in the figure for better understanding.

Container 100 is configured to heat up or to heat water introduced or conveyed into container 100 via water inlet 111 by means of heat exchanger tube 2. In this process, the water having an initial temperature at water inlet 111 is conveyed in the flow direction according to arrow P3 into container 100 via water inlet 111 in order to be heated up or heated in container 100.

Furthermore, container 100 is configured to discharge or convey the heated or heated up water out of container 100 via water outlet 112. In this process, the heated up or heated water is conveyed in the flow direction according to arrow P4 out of container 100 via water outlet 112. In this case, the water at the water outlet has a final temperature which is increased compared to the initial temperature.

To convey the water into container 10 and out of container 100, a pump (not shown) can be used. Arrows P1 and P4 and arrows P2 and P3 run in opposite directions such that their conveying direction and/or flow direction runs in opposite directions.

When the water flows through container 100, the water is constantly heated up or heated by the waste heat and/or the heat of heat exchanger tube 2. In this way, it is possible to heat up and/or warm up the water of, for example, a water basin, in particular a swimming pool or a swimming pond.

In a further development of container 100, flow guide plates are disposed in the interior of container 100, said flow guide plates guiding the water flowing into the water inlet in such a manner that the water is forced to flow in close proximity to heat exchanger tube when flowing through the container in such a manner that it first flows along tube section 29, then along tube section 28, then along tube section 27, then along tube section 26, then along tube section 22, then along tube section 21 and finally leaves the container via water outlet 112 and subsequently can be further used. Thereby, the water can be heated up extremely efficiently.

Figure 12:
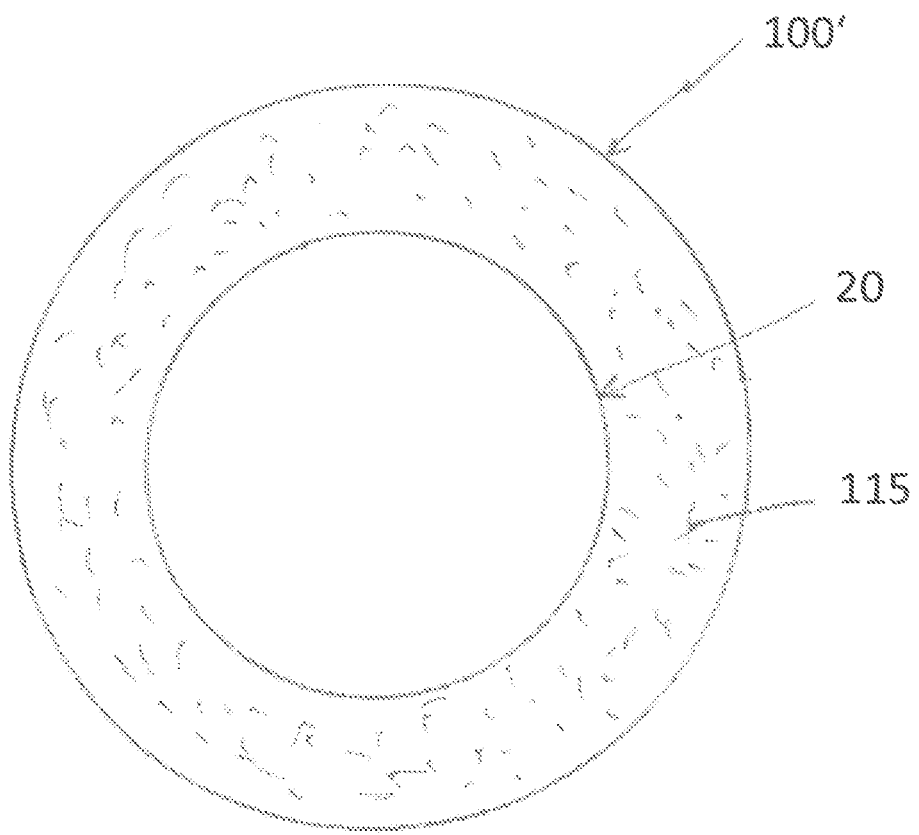
FIG. 12: shows a cross section through another container according to the invention.

In a further development of the container according to the invention, said container consists of a tube accommodating heat exchanger tube 20, the water to be heated up flowing through said tube and flowing around heat exchanger tube 20 in this process. In this process, the water to be heated up flows around the entire surface of the heat exchanger tube, the water also flowing through tubes 10 penetrating heat exchanger tube 20. A schematic illustration of such a device is illustrated in FIG. 12. In this case, the container or the tube accommodating heat exchanger tube 20 is designated by reference numeral 100'. The water flowing in tube 100' is designated by reference numeral 115.

LIST OF REFERENCE SIGNS 1 heat exchanger
2 heat exchanger tube
3 connection section
4 connection section
5 opening
6 opening
9 central longitudinal axis
10 tube
10' tube
11 tube socket (first end)
12 tube socket (second end)
13 central longitudinal axis
14 attachment plate
15 opening
16 opening
17 flange (mounting plate/mounting flange)
18 attachment for a gas burner
19 attachment for a fan
20 tube section
21 tube section
22 tube section
24 gas burner
25 fan
26 tube section
27 tube section
28 tube section
29 tube section
30 evaporation device
31 evaporation device housing
32 opening
33 duct
34 condenser
35 channel
36 tube, tube system
40 heat exchanger device
41 heat exchanger device housing
42 opening
43 attachment socket
44 attachment socket
50 installation
51 frame/stand
100 container (water container)
100' container (water container)
101 housing
102 cover
103 seal
104 screw (screw connection)
105 water conduit
106 water conduit
111 inlet
112 outlet
115 water
α angle
P1 arrow
P2 arrow
P3 arrow
P4 arrow

The invention claimed is:

1. A container (100) comprising:
a heat exchanger (1) for heating or evaporating a fluid, said heat exchanger (1) comprising
a heat exchanger tube (2); and
a plurality of penetrating tubes (10) penetrating the heat exchanger tube (2) and being spaced apart from each other,
wherein the heat exchanger tube (2) has twice as many openings (5, 6) as penetrating tubes (10),
wherein each penetrating tube (10) is guided through two of the openings (5, 6), and wherein each penetrating tube (10) is connected to the heat exchanger tube (2) on both sides of each penetrating tube via end tube sockets (11, 12), wherein the heat exchanger tube (2) of the heat exchanger (1) has a plurality of tube sections (20, 21, 22, 26, 27, 28, 29) of which at least two of the plurality of tube sections (20, 22, 27, 29) are penetrated by one or more of the penetrating tubes;

wherein at least two of the plurality of tube sections run parallel or coaxially to each other in the container (100) with respect to a central longitudinal axis of the container (100) and the heat exchanger tube (2) of the heat exchanger (1) runs in a meandering manner in the container (100).

2. The container (100) according to claim 1, characterized in that the openings (5, 6) are diametrically opposed or central longitudinal axes (13) of the plurality of penetrating tubes (10) run orthogonally to a central longitudinal axis (9) of the heat exchanger tube (2).

3. The container (100) according claim 1, characterized in that the plurality of penetrating tubes (10) are arranged within the heat exchanger tube (2) such that longitudinal axes of adjacent penetrating tubes are offset at an angular offset such that the plurality of penetrating tubes form a helical arrangement along a length of the heat exchanger tube.

4. The container (100) according to claim 1, characterized in that, in an axial direction of the heat exchanger tube (2), the plurality of penetrating tubes (10) are offset relative to each other at an angle (a) in the range of 15° to 25°.

5. The container (100) according to claim 1, characterized in that a diameter of the penetrating tubes (10) is in the range of ⅙ to ½ of the diameter of the heat exchanger tube (2).

6. The container (100) according to claim 1, characterized in that the end tube sockets (11, 12) project outwardly at their ends from an outer surface of the heat exchanger tube (2).

7. The container (100) according to claim 1, characterized in that a connection between the end tube sockets (11, 12) and the heat exchanger tube (2) is a welded connection, a rolled connection, a soldered connection, an adhesive connection or a pressed connection.

8. The container (100) according to claim 1, characterized in that the heat exchanger tube (2) comprises three tube sections (20, 21, 22), wherein a second tube section (21) connects a first tube section (20) and a third tube section (22) to each other and wherein the first tube section (20) and the third tube section (22) are disposed parallel to each other.

9. The container (100) according to claim 1, characterized in that the heat exchanger (1) comprises an attachment plate (14) for the connection to an evaporation device (30) or a heat exchanger device (40), wherein the attachment plate (14) has two openings (15, 16) for accommodating a first tube section (20) and a third tube section (22) of the heat exchanger tube (2).

10. The container (100) according to claim 1, characterized in that the heat exchanger (1) comprises a flange (17), which has two openings, for the connection to a gas burner (24) and a fan (25), wherein the flange (17) is disposed at an end of two of the tube sections (3, 4) of the heat exchanger tube (2).

11. The container (100) according to claim 1, wherein the container (100) comprises a cover (102), and wherein the cover (102) has an attachment for a gas burner (24), an attachment for a fan (25), a water inlet (111) and a water outlet (112).

12. The container (100) according to claim 11, wherein the container (100) is configured to heat up, heat or evaporate water introduced or conveyed into the container (100) via the water inlet (111) by means of the heat exchanger tube (2).

13. The container (100) according to claim 11, wherein the container (100) is configured to discharge or convey heated or evaporated water out of the container (100) via the water outlet (112).

14. A water basin comprising a container (100) according to claim 1.

15. The container according to claim 1, wherein at least one of the plurality of tube sections of the heat exchanger tube includes a longitudinal axis that is not parallel with the central longitudinal axis of the container.

\* \* \* \* \*